United States Patent
Moniz et al.

(10) Patent No.: US 7,493,753 B2
(45) Date of Patent: Feb. 24, 2009

(54) GAS TURBINE ENGINE ASSEMBLY AND METHODS OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 11/253,932

(22) Filed: Oct. 19, 2005

(65) Prior Publication Data

US 2007/0084185 A1   Apr. 19, 2007

(51) Int. Cl.
*F02K 3/00* (2006.01)

(52) U.S. Cl. ............... 60/268; 60/226.1; 60/39.162; 415/9

(58) Field of Classification Search .......... 60/228, 60/226.1, 39.162; 415/9, 174.4; 416/2
See application file for complete search history.

(56) References Cited

U.S. PATENT DOCUMENTS

| | | | | |
|---|---|---|---|---|
| 3,729,957 A * | 5/1973 | Petrie et al. | ............... | 60/226.1 |
| 3,866,415 A * | 2/1975 | Ciokajlo | ............... | 60/226.1 |
| 4,005,575 A * | 2/1977 | Scott et al. | ............... | 60/226.1 |
| 4,251,987 A * | 2/1981 | Adamson | ............... | 60/805 |
| 4,688,995 A * | 8/1987 | Wright et al. | ............... | 416/127 |
| 4,751,816 A * | 6/1988 | Perry | ............... | 60/226.1 |
| 4,827,712 A * | 5/1989 | Coplin | ............... | 60/226.1 |
| 5,010,729 A | 4/1991 | Adamson et al. | | |
| 5,105,618 A * | 4/1992 | Lardellier | ............... | 60/226.1 |
| 5,806,303 A | 9/1998 | Johnson | | |
| 5,809,772 A | 9/1998 | Giffin, III et al. | | |
| 5,813,214 A | 9/1998 | Moniz et al. | | |
| 5,867,980 A | 2/1999 | Bartos | | |
| 6,158,210 A * | 12/2000 | Orlando | ............... | 60/226.1 |
| 6,381,948 B1 * | 5/2002 | Klingels | ............... | 60/226.1 |
| 6,619,030 B1 | 9/2003 | Seda et al. | | |
| 6,622,473 B2 * | 9/2003 | Becquerelle et al. | ....... | 60/226.1 |
| 6,684,626 B1 | 2/2004 | Orlando et al. | | |
| 6,711,887 B2 | 3/2004 | Orlando et al. | | |
| 6,732,502 B2 | 5/2004 | Seda et al. | | |
| 6,739,120 B2 | 5/2004 | Moniz et al. | | |
| 6,763,652 B2 | 7/2004 | Baughman et al. | | |
| 6,763,653 B2 | 7/2004 | Orlando et al. | | |
| 6,763,654 B2 | 7/2004 | Orlando et al. | | |
| 2006/0090451 A1 * | 5/2006 | Moniz et al. | ............... | 60/226.1 |
| 2007/0084184 A1 * | 4/2007 | Orlando et al. | ............... | 60/204 |
| 2007/0084185 A1 * | 4/2007 | Moniz et al. | ............... | 60/204 |
| 2007/0084186 A1 * | 4/2007 | Orlando et al. | ............... | 60/204 |
| 2007/0084187 A1 * | 4/2007 | Moniz et al. | ............... | 60/204 |
| 2007/0084188 A1 * | 4/2007 | Orlando et al. | ............... | 60/204 |

(Continued)

*Primary Examiner*—William H Rodríguez
(74) *Attorney, Agent, or Firm*—William Scott Andes, Esq.; Armstrong Teasdale LLP

(57) ABSTRACT

A method facilitates assembling a gas turbine engine. The method comprises coupling a low-pressure turbine rotatable about a drive shaft to a counter-rotating fan assembly including a first fan assembly and a second fan assembly wherein the first fan assembly rotates in a first direction and the second fan assembly rotates in an opposite second direction. The method also comprises coupling a planetary gearbox substantially circumferentially about the drive shaft such that an input of the gearbox is coupled to the low-pressure turbine and an output of the gearbox is coupled to the counter-rotating fan assembly, and such that the gearbox is positioned within a lubrication fluid sump that substantially circumscribes the gearbox.

17 Claims, 4 Drawing Sheets

U.S. PATENT DOCUMENTS

2007/0084189 A1* 4/2007 Moniz et al. .................. 60/204
2007/0084190 A1* 4/2007 Moniz et al. .................. 60/204
2007/0240399 A1* 10/2007 Orlando et al. .......... 60/39.162
2008/0098716 A1* 5/2008 Orlando et al. ............ 60/226.1

* cited by examiner

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned forward of the high-pressure turbine. The low-pressure turbine includes a rotor assembly having a fan coupled to a drive shaft. The low-pressure turbine rotatably drives the fan through the drive shaft. To facilitate increasing engine efficiency, at least one known gas turbine engine includes a counter-rotating low-pressure turbine that is coupled to a counter-rotating fan and/or a counter-rotating booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. Accordingly, the overall weight, design complexity and/or manufacturing costs of such an engine are increased.

BRIEF DESCRIPTION OF THE INVENTION

In one aspect, a method for assembling a gas turbine engine is provided. The method comprises coupling a low-pressure turbine rotatable about a drive shaft to a counter-rotating fan assembly including a first fan assembly and a second fan assembly wherein the first fan assembly rotates in a first direction and the second fan assembly rotates in an opposite second direction. The method also comprises coupling a planetary gearbox substantially circumferentially about the drive shaft such that an input of the gearbox is coupled to the low-pressure turbine and an output of the gearbox is coupled to the counter-rotating fan assembly, and such that the gearbox is positioned within a lubrication fluid sump that substantially circumscribes the gearbox.

In another aspect, a gas turbine engine assembly is provided. The gas turbine engine includes a low pressure turbine, a counter-rotating fan assembly, a planetary gearbox, and a lubrication fluid sump. The counter-rotating fan assembly includes a first fan assembly that is rotatable in a first direction and a second fan assembly that is rotatable in an opposite second direction. The low pressure turbine is coupled to the fan assembly via a drive shaft. The planetary gearbox includes an input and an output. The gearbox input is coupled to the low-pressure turbine, and the gearbox output is coupled to the counter-rotating fan assembly. The lubrication fluid sump is bounded at least partially by the drive shaft. The planetary gearbox is contained within the fluid sump such that the lubrication fluid sump substantially circumscribes the planetary gearbox.

In a further aspect, a gas turbine engine assembly is provided. The engine assembly includes a counter-rotating fan assembly a core engine, a planetary gearbox, and a lubrication fluid sump. The counter-rotating fan assembly includes a first fan assembly that is rotatable in a first direction and a second fan assembly that is rotatable in an opposite second direction. The core engine is downstream from the counter-rotating fan assembly and is coupled to the counter-rotating fan assembly via a drive shaft. The planetary gearbox is coupled to the counter-rotating fan assembly. The lubrication fluid sump is coupled between the core engine and the counter-rotating fan assembly. The lubrication fluid sump is bounded at least partially by the drive shaft. The gearbox is housed within the lubrication fluid sump such that the gearbox is substantially isolated from axial loading generated by the counter-rotating fan assembly.

DETAILED DESCRIPTION OF THE INVENTION

Figure 1:
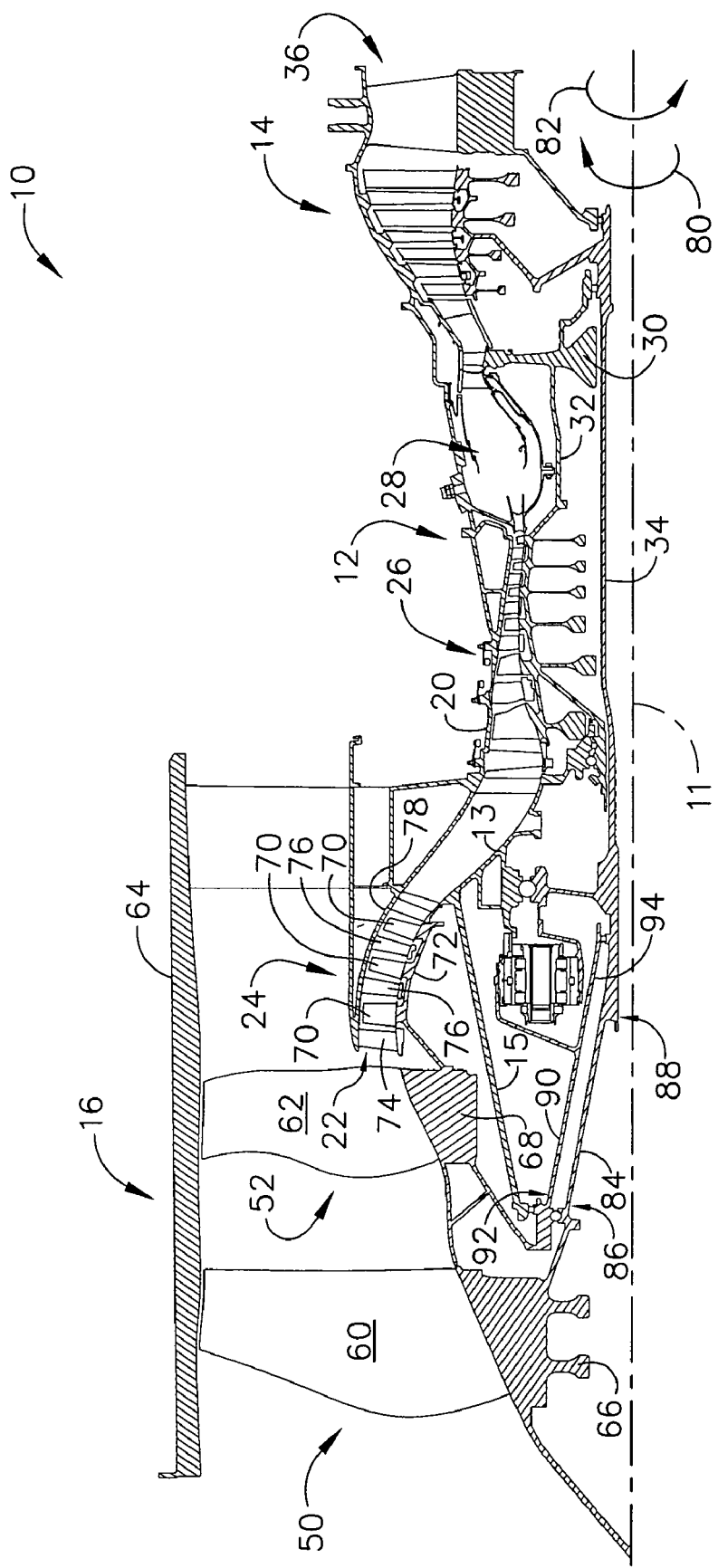
FIG. 1 is a cross-sectional view of a portion of an exemplary turbine engine assembly.

FIG. 1 is a cross-sectional view of a portion of an exemplary turbine engine assembly 10 having a longitudinal axis 11. In the exemplary embodiment, turbine engine assembly 10 includes a core gas turbine engine 12 generally defined by a frame 13. A low-pressure turbine 14 is coupled axially aft of core gas turbine engine 12 and a counter-rotating fan assembly 16 is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, core gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first rotatable drive shaft 32, and then to second or low-pressure turbine 14 to facilitate driving counter-rotating fan assembly 16 and booster compressor 24 through a second rotatable drive shaft 34 that is coupled coaxially with first drive shaft 32. After driving low-pressure turbine 14, the combustion products leave turbine engine assembly 10 through an exhaust nozzle 36 to provide propulsive jet thrust.

Figure 2:
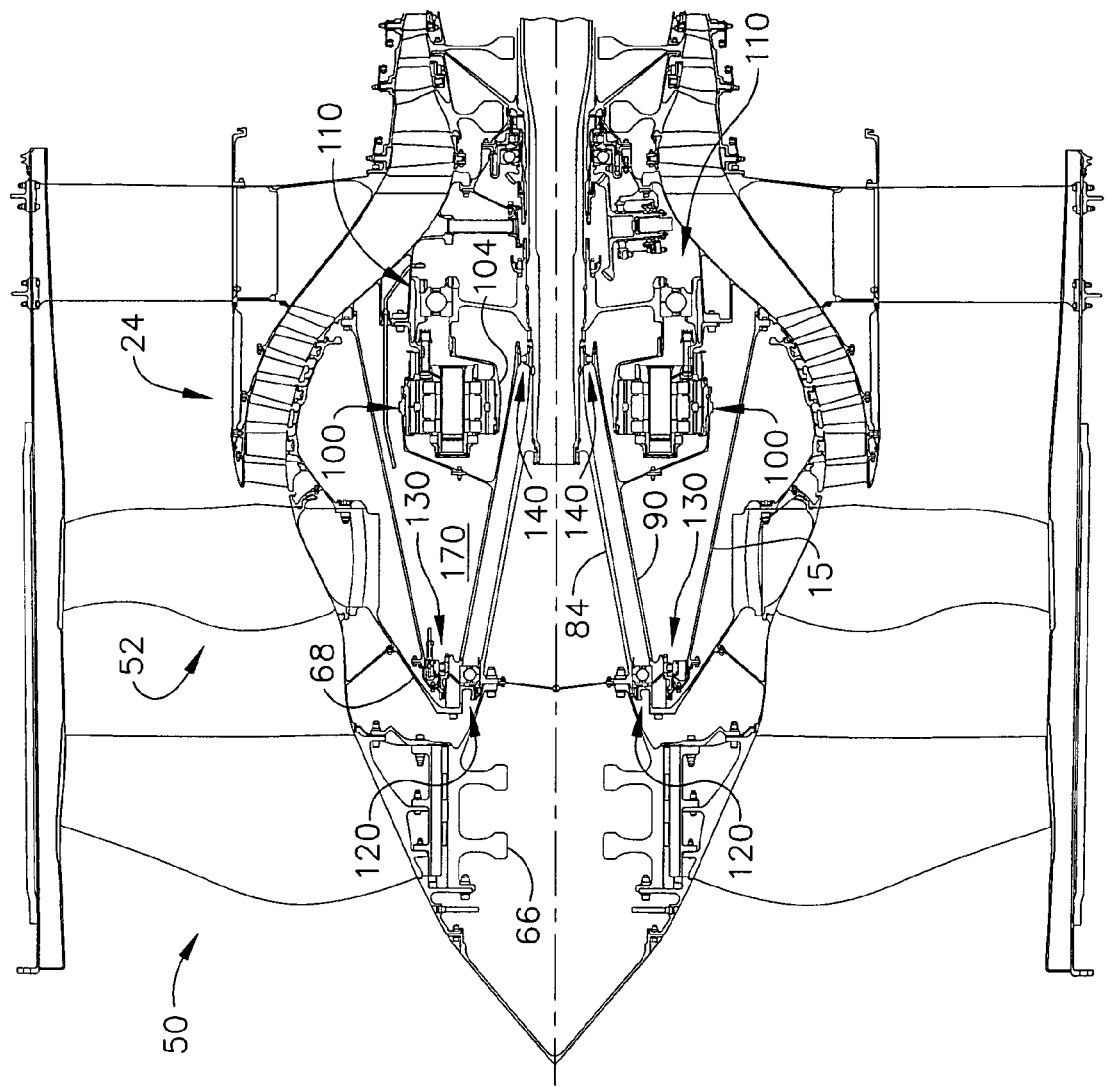
FIG. 2 is an enlarged cross-sectional view of a portion of a counter-rotating fan assembly shown in FIG. 1.
Figure 3:
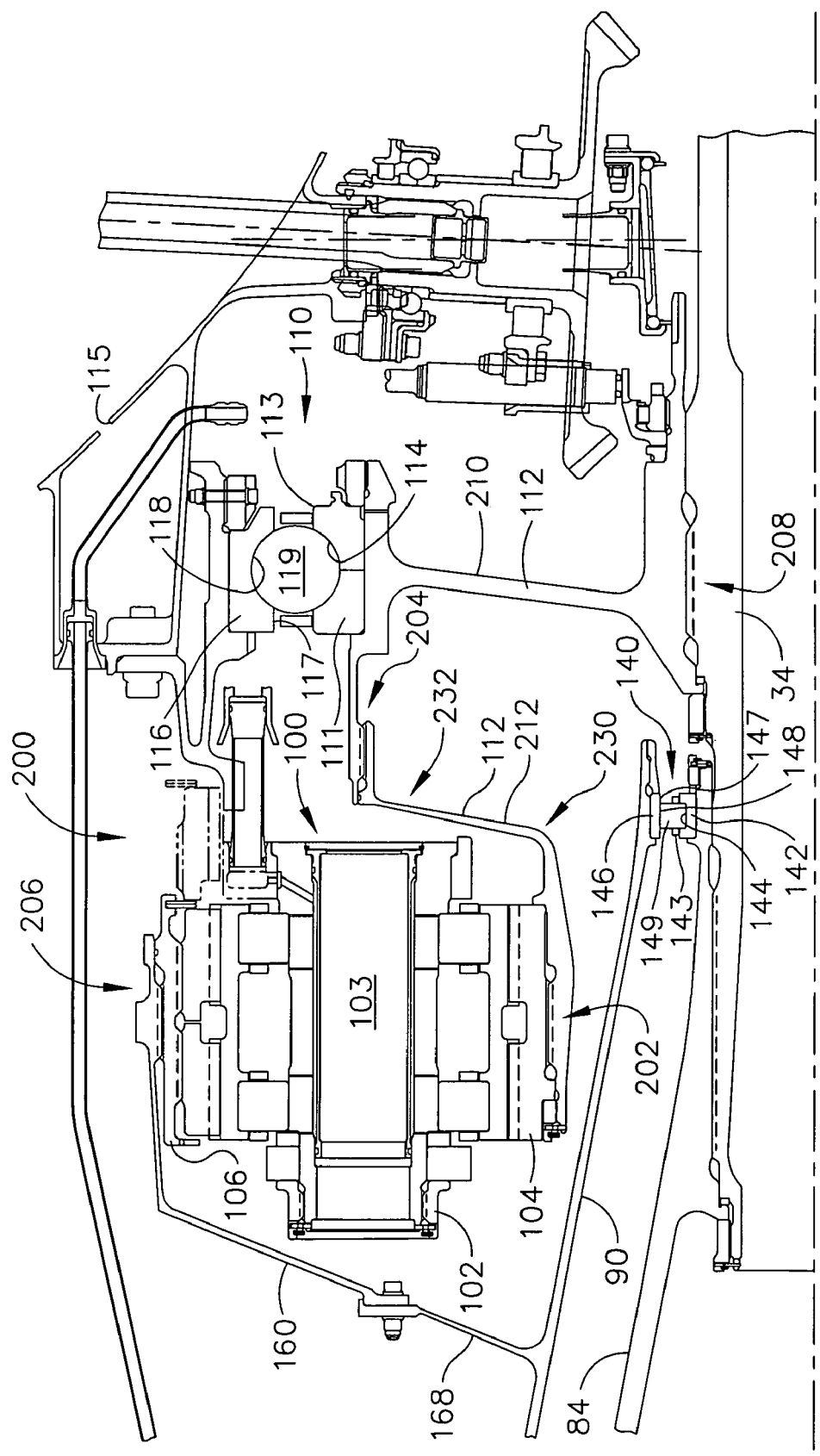
FIG. 3 is an enlarged cross-sectional view of a portion of the counter-rotating fan assembly shown in FIG. 2.

Counter-rotating fan assembly 16 includes a first or forward fan assembly 50 and a second or an aft fan assembly 52 configured to rotate about longitudinal axis 11. The terms "forward fan" and "aft fan" are used herein to indicate that fan assembly 50 is coupled axially upstream from fan assembly 52. In one embodiment, fan assemblies 50 and 52 are positioned at a forward end of core gas turbine engine 12, as shown in FIGS. 1-3. In an alternative embodiment, fan assemblies 50 and 52 are positioned at an aft end of core gas turbine engine 12. Fan assemblies 50 and 52 each includes at least one row of rotor blades 60 and 62, respectively, and are positioned within a nacelle 64. Rotor blades 60 are coupled to rotor disk 66 and rotor blades 62 are coupled to rotor disk 68.

In one embodiment, booster compressor 24 includes a plurality of rows of rotor blades 70 that are coupled to a respective rotor disk 72. Booster compressor 24 is positioned aft of an inlet guide vane assembly 74 and is coupled to aft fan assembly 52 such that booster compressor 24 rotates at a rotational speed that is substantially equal to a rotational speed of aft fan assembly 52. Although booster compressor 24 is shown as having only three rows of rotor blades 70, booster compressor 24 may have any suitable number and/or rows of rotor blades 70, such as a single row of rotor blades 70 or a plurality of rows of rotor blades 70 that are interdigitated with a plurality of rows of guide vanes 76. In one embodiment, inlet guide vanes 76 are fixedly or securely coupled to a booster case 78. In an alternative embodiment, rotor blades 70 are rotatably coupled to rotor disk 72 such that inlet guide vanes 76 are movable during engine operation to facilitate varying a quantity of air channeled through booster compressor 24. In another alternative embodiment, turbine engine assembly 10 does not include booster compressor 24.

As shown in FIG. 1, low-pressure turbine 14 is coupled to forward fan assembly 50 through shaft 34 such that forward fan assembly 50 rotates in a first rotational direction 80. Aft fan assembly 52 is coupled to drive shaft 34 and/or low-pressure turbine 14 such that aft fan assembly 52 rotates in an opposite second rotational direction 82.

FIG. 2 is a schematic diagram of a portion of counter-rotating fan assembly 16 shown in FIG. 1. In one embodiment, first fan assembly 50 includes a cone 84 positioned about longitudinal axis 11. Cone 84 is connected at a first or forward end 86 to rotor disk 66 and at a second or aft end 88 to drive shaft 34, as shown in FIG. 2. Second fan assembly 52 includes a cone 90 positioned coaxially about at least a portion of cone 84 along longitudinal axis 11. Cone 90 is coupled at a first or forward end 92 to rotor disk 68 and at a second or aft end 94 to an output of a gearbox 100 and/or to aft end 88 of cone 84 via a rolling bearing assembly, as described in greater detailed below.

FIG. 3 is a schematic diagram of a portion of the counter-rotating fan assembly 16 shown in FIG. 2. In one embodiment, counter-rotating fan assembly 16 also includes a gearbox 100 that is coupled between aft fan assembly 52 and drive shaft 34 to facilitate rotating aft fan assembly 52 in opposite rotational direction 82 with respect to rotational direction 80 in which forward fan assembly 50 rotates. Gearbox 100 has a generally toroidal shape and is configured to be positioned circumferentially about drive shaft 34 to extend substantially about drive shaft 34. As shown in FIG. 3, gearbox 100 includes a support structure 102, at least one gear 103 coupled within support structure 102, an input 104 and an output 106.

In one embodiment, gearbox 100 has a gear ratio of approximately 2.0 to 1 such that forward fan assembly 50 rotates at a rotational speed that is approximately twice the rotational speed of aft fan assembly 52. In another embodiment, forward fan assembly 50 rotates with a rotational speed that is between approximately 0.67 and approximately 2.1 times faster than the rotational speed of aft fan assembly 52. In this embodiment, forward fan assembly 50 may rotate at a rotational speed greater than, equal to or less than the rotational speed of aft fan assembly 52.

In one embodiment, a first bearing assembly, such as thrust bearing assembly 110 as shown in FIGS. 1-3, is positioned about drive shaft 34 and/or longitudinal axis 11. Thrust bearing assembly 110 operatively couples and/or is mounted between drive shaft 34 and frame 13 of core gas turbine engine 12. Referring further to FIG. 3, in one embodiment, thrust bearing assembly 110 includes a radially positioned inner race 111 that is mounted with respect to drive shaft 34. As shown in FIG. 3, inner race 111 is mounted to a drive shaft extension 112 operatively coupled to drive shaft 34 so that inner race 111 is rotatable about longitudinal axis 11 with drive shaft 34. In one particular embodiment, drive shaft extension 112 is splined to drive shaft 34. Inner race 111 has a surface 113 defining an inner groove 114 of thrust bearing assembly 110. Surface 113 defining inner groove 114 has a generally arcuate profile.

Thrust bearing assembly 110 includes a radially positioned outer race 116 securely coupled to frame 13. In one embodiment, outer race 116 and/or frame 13 acts as a ground for the transfer of thrust loads and/or forces developed or generated by counter-rotating fan assembly 16 and/or booster compressor 24, as discussed in greater detail below. Outer race 116 has a surface 117, generally opposing surface 113, which forms an outer groove 118 of thrust bearing assembly 110. Surface 117 defining outer groove 118 has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to gearbox 100.

Figure 4:
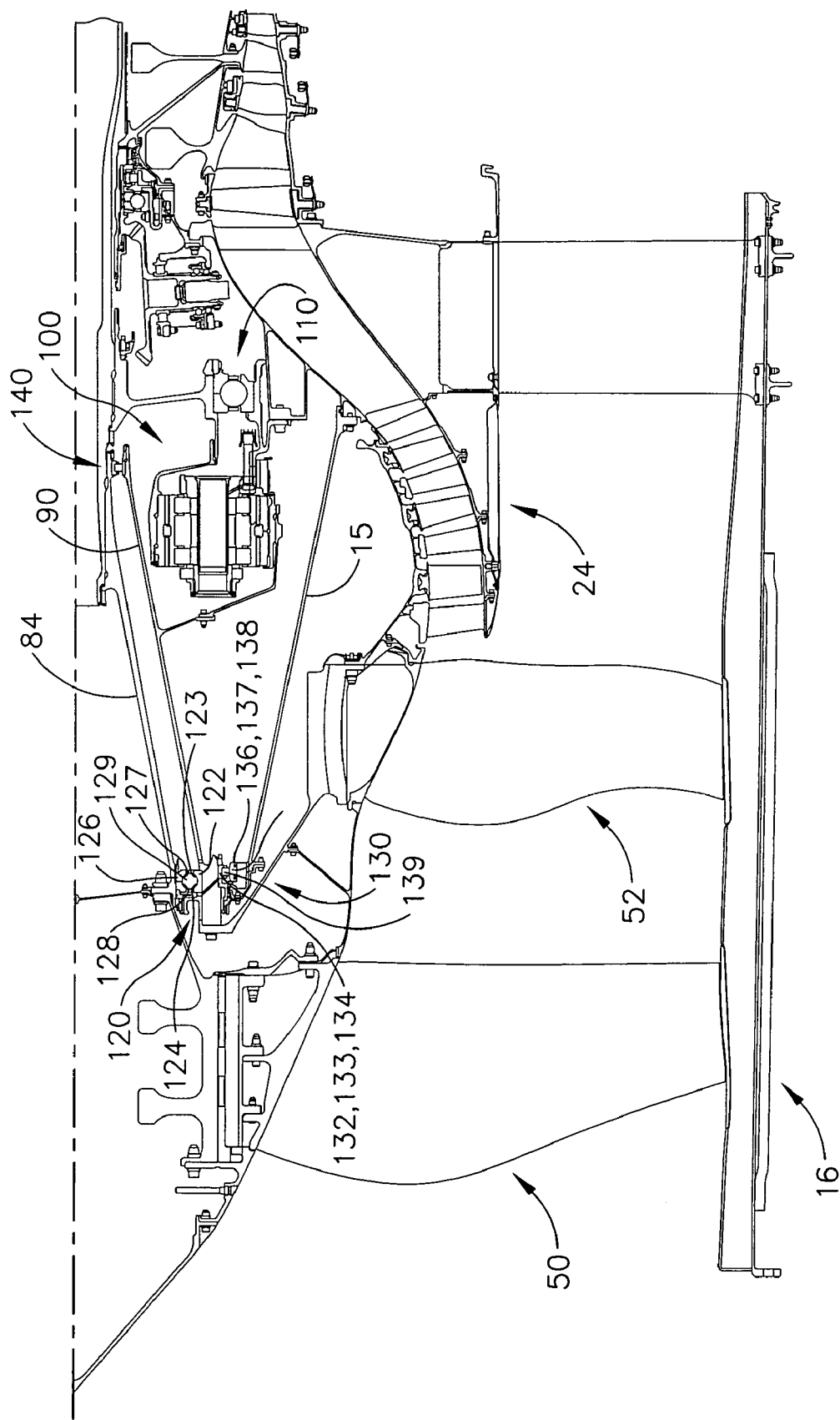
FIG. 4 is an enlarged cross-sectional view of a portion of the counter-rotating fan assembly shown in FIG. 2.

Referring to FIG. 4, a second bearing assembly, such as thrust bearing assembly 120, is positioned radially about longitudinal axis 11. In one embodiment, thrust bearing assembly 120 operatively couples and/or is mounted between a forward end portion of first fan assembly 50, such as at or near forward end 86 of cone 84, and a forward end portion of second fan assembly 52, such as at or near forward end 92 of cone 90. In one embodiment, thrust bearing assembly 120 includes a radially positioned inner race 122 that is mounted with respect to an outer surface of cone 84. As shown in FIG. 4, inner race 122 is mounted to cone 84 so that inner race 122 is rotatable about longitudinal axis 11 with first fan assembly 50. Inner race 122 has a surface 123 defining an inner groove 124 of thrust bearing assembly 110. Surface 123 defining inner groove 124 has a generally arcuate profile.

Thrust bearing assembly 120 includes a radially positioned outer race 126 that is mounted with respect to an inner surface of cone 90. As shown in FIG. 4, inner race 122 is mounted to cone 90 so that outer race 126 is rotatable about longitudinal axis 11 with second fan assembly 52. Outer race 126 has a surface 127, generally opposing surface 123, which forms an outer groove 128 of thrust bearing assembly 120. Surface 127 defining outer groove 128 has a generally arcuate profile. At least one roller element, such as a plurality of bearings 129, is movably positioned between inner race 122 and outer race 126. Each bearing 129 is in rolling contact with inner groove 124 and outer groove 128 to facilitate relative rotational movement of first fan assembly 50 and/or second fan assembly 52.

In one embodiment, thrust bearing assemblies 110 and/or 120 facilitate maintaining forward fan assembly 50 and/or aft fan assembly 52 in a relatively fixed axial position. During operation of counter-rotating fan assembly 16, thrust loads and/or forces generated by first fan assembly 50 are transferred directly from first fan assembly 50 to first thrust bearing assembly 110. Further, thrust loads and/or forces generated by second fan assembly 52 and/or booster compressor 24 during operation are transferred from second fan assembly 52 and/or booster compressor 24 to second thrust bearing assembly 120 and from second thrust bearing assembly 120 through drive shaft 34 to first thrust bearing assembly 110. As a result of transferring thrust loads and/or forces to thrust bearing assembly 110 and/or thrust bearing assembly 120, the transfer of thrust loads and/or forces through gearbox 100, operatively coupled to second fan assembly 52, is prevented or limited. In alternative embodiments, any suitable bearing assembly known to those skilled in the art and guided by the teachings herein provided can be used for or in addition to bearing assembly 110 and/or bearing assembly 120.

In one embodiment, a bearing assembly, such as roller bearing assembly 130, is positioned about the outer surface of cone 90 at or near forward end 92, as shown in FIG. 4. Roller bearing assembly 130 is connected between frame 13 and forward end 92. In one embodiment, roller bearing assembly 130 acts as a differential bearing assembly in combination with thrust bearing assembly 120 to support second fan assembly 52 and/or transfer thrust loads and/or forces from second fan assembly 52 to frame 13. In one embodiment, roller bearing assembly 130 includes an inner race 132 that is mounted with respect to cone 90, as shown in FIG. 4. Inner race 132 is mounted to forward end 92 of cone 90 so that inner race 132 is rotatable about longitudinal axis 11 with second fan assembly 52. Inner race 132 has a surface 133 defining an inner groove 134 of roller bearing assembly 130.

Roller bearing assembly 130 includes an outer race 136 that is securely coupled to frame 13. In one embodiment, outer race 136 is securely coupled with respect to structural support member 15 and/or frame 13. Structural support member 15 and/or frame 13 acts as a ground for the transfer of thrust loads and/or forces developed or generated by counter-rotating fan assembly 16 and/or booster compressor 24. Outer race 136 has a surface 137, generally opposing surface 133, which forms an outer groove 138 of roller bearing assembly 130. At least one roller element, such as a plurality of rollers 139, is movably positioned between inner race 132 and outer race 136. Each roller 139 is in rolling contact with inner groove 134 and outer groove 138.

In one embodiment, a bearing assembly, such as roller bearing assembly 140, is positioned about the outer surface of cone 84 at or near aft end 88, as shown in FIG. 3. Roller bearing assembly 140 is connected between cone 84 and cone 90. Roller bearing assembly 140 includes an inner race 142 that is mounted with respect to aft end 88, as shown in FIG. 2. Inner race 142 is mounted to cone 84 so that inner race 142 is rotatable about longitudinal axis 11 with first fan assembly 50. Inner race 142 has a surface 143 defining an inner groove 144 of roller bearing assembly 140.

Roller bearing assembly 140 includes an outer race 146 that is mounted with respect to aft end 94 of cone 90, as shown in FIG. 3. Outer race 146 is mounted to cone 90 so that outer race 146 is rotatable about longitudinal axis 11 with second fan assembly 52. Outer race 146 has a surface 147, generally opposing surface 143, which forms an outer groove 148 of roller bearing assembly 140. At least one roller element, such as a plurality of rollers 149, is movably positioned between inner race 142 and outer race 146. Each roller 149 is in rolling contact with inner groove 144 and outer groove 148 to facilitate relative rotational movement of cone 84 and/or cone 90.

In this embodiment, roller bearing assemblies 130 and 140 facilitate providing rotational support to aft fan assembly 52 such that aft fan assembly 52 can rotate freely with respect to forward fan assembly 50. Accordingly, roller bearing assemblies 130 and 140 facilitate maintaining aft fan assembly 52 in a relatively fixed radial position within counter-rotating fan assembly 16. In alternative embodiments, any suitable bearing assembly known to those skilled in the art and guided by the teachings herein provided can be used for or in addition to bearing assembly 130 and/or bearing assembly 140.

In one embodiment, gearbox 100 is connected to a fixed or stationary component of gas turbine engine 10, such as frame 13 of core turbine engine 12, as shown in FIG. 3. Gearbox input 104 is rotatably coupled to second drive shaft 34 through drive shaft extension 112 that is splined to drive shaft 34. Gearbox output 106 is rotatably coupled to aft fan assembly 52 through an output structure 160. A first end of output structure 160 is splined to gearbox output 106 and a second end of output structure 160 is coupled to aft fan forward shaft 168 to facilitate driving aft fan assembly 52.

Referring to FIG. 3, in one embodiment, gas turbine engine assembly 10 includes a spline system 200 for mounting gearbox 100 to counter-rotating fan assembly 16. Gearbox 100 is fixedly or securely coupled to frame 13 of core gas turbine engine 12, for example at gearbox support structure 102. Spline system 200 isolates gearbox 100 from first fan assembly 50 and/or second fan assembly 52 to prevent or limit thrust loads and/or forces exerted on gearbox 100 as a result of counter-rotating fan assembly 16 operation. First fan assembly 50 is rotatably coupled to input 104 such that first fan assembly 50 rotates in a first direction, as indicated by rotational arrow 80 in FIG. 1. Second fan assembly 52 is rotatably coupled to output 106 such that second fan assembly 52 rotates in a second direction, as indicated by rotational arrow 82 in FIG. 1, opposite the first direction.

As shown in FIG. 3, spline system 200 includes a plurality of spline assemblies, such as spline assembly 202, 204, 206 and/or 208. In one embodiment, a first spline assembly 202 couples input 104 to drive shaft extension 112. Drive shaft extension 112 includes a first portion 210 and a second portion 212, as shown in FIG. 3. First spline assembly 202 couples input 104 to first portion 210 and a second spline assembly 204, the same or similar to first spline assembly 202, couples first portion 210 to second portion 212 to rotatably couple input 104 to drive shaft 34. Further, second spline assembly 204 facilitates movement of thrust bearing assembly 110 with respect to gearbox 100 in the axial direction, i.e., along or parallel with longitudinal axis 11 of turbine engine assembly 10.

In one embodiment, spline assembly 204 includes a member forming a plurality of splines positioned about a periphery of the member. The member, connected to second portion 212 of drive shaft extension 112, is positionable within a cavity formed in a cooperating housing, connected to first portion 210, such that the plurality of splines mesh or interfere with slots formed on an inner periphery of the housing to transfer torsional loads and/or forces from second portion 212 to first portion 210 of drive shaft extension 112. Further, the member is positioned within the cooperating housing to facilitate movement of the member within the housing in an axial direction, e.g., along or parallel with longitudinal axis 11, which facilitates axial movement of second portion 212 with respect to first portion 210.

In one particular embodiment, each spline assembly 204, 206 and 208 are the same or similar, as described above with reference to spline assembly 204. A third spline assembly 206 slidably couples output 106 to output structure 160. Third spline assembly 206 facilitates axial movement of aft fan forward shaft 168 with respect to gearbox 100. In one embodiment, a fourth spline assembly 208 slidably couples second portion 212 of drive shaft extension 112 to drive shaft

34. During operation, spline assemblies 202, 204, 206 and/or 208 pass only torsional or torque loads and/or forces to gearbox 100 such that gearbox 100 remains in a substantially fixed position with respect to the frame of low-pressure turbine 14.

In one embodiment, drive shaft extension 112 and/or output structure 160 include at least one flexible arm compensating for a radial deflection of gearbox 100. In a particular embodiment, first portion 210 includes a radially inner portion 230 that is coupled to input 104 through spline assembly 202 and a radially outer portion 232 that is coupled to second portion 212 through spline assembly 204. First portion 210 has a first thickness at or near inner portion 230 and a second thickness at or near outer portion 232, which is less than first thickness. In this particular embodiment, a thickness of first portion 210 gradually decreases from radially inner portion 230 to radially outer portion 232. The second thickness is selected such that first portion 230 will separate from second portion 232, i.e. first portion 210 will break, when first portion 210 is subjected to a determined torsional load and/or force. During operation of engine assembly 10, relatively large radial loads and/or forces may be applied to aft fan assembly 52. To compensate for the relatively large radial loads and/or forces, and to ensure continued engine operation, in one embodiment first portion 210 breaks such that forward fan assembly 50 continues to operate as aft fan assembly 52 freewheels.

During operation, as second drive shaft 34 rotates, second drive shaft 34 causes input 104 to rotate in first rotational direction 80, which subsequently rotates output 106 in opposite second rotational direction 82. Because output structure 160 is coupled to aft fan assembly 52, drive shaft 34 causes aft fan assembly 52 to rotate via gearbox 100 in opposite second direction 82. In one embodiment, gearbox 100 is located within a sump 170 at least partially defined between output structure 160 and structural support member 15 configured to support aft fan assembly 52. During operation, gearbox 100 is at least partially submerged within lubrication fluid contained in sump 170 to continuously lubricate gearbox 100 during engine operation.

More specifically, sump 170 has a radially inner boundary defined by cone 84, an axially forward boundary defined by bearing assembly 130, a radially outer boundary defined by support structure 15, and an axially aft boundary defined by structure 13, high-speed compressor 26, and shaft 34.

As gas turbine engine 10 rotates, lubrication oil is forced radially outward due to centrifugal force. The oil is channeled to bearing assemblies 110, 120, 130, and 140 to lubricating the bearings. Moreover, lubrication fluid is channeled around and through gearbox 100 to facilitate lubricating the various gears and bearing coupled within the gearbox. More specifically, gearbox 100 does not include and outer casing such that lubrication fluid channeled into sump 170 flows over the exposed gears and bearings within gearbox 100.

After gearbox 100 and bearing assemblies 110, 120, 130, and 140 are lubricated, spent oil is channeled through an opening 115 defined within structural member 13 and exits gas turbine engine assembly 10. More specifically, because gas turbine engine 10 is rotating, centrifugal force causes lubrication oil to be forced radially outward toward an inner surface of structural member 15 wherein the lubrication oil is channeled afterward along member 15 through opening 115 extending therethrough. The oil is then channeled through engine casing 20.

The gas turbine engine assembly described herein includes a counter-rotating fan assembly having a geared single rotation low-pressure turbine. The assembly facilitates reducing at least some of the complexities associated with known counter-rotating low-pressure turbines. More specifically, the gas turbine engine assembly described herein includes a toroidal shaped gearbox that extends radially around the drive shaft and is coupled within a substantially radially-shaped gearbox. Since, the gearbox does not include an outer housing, the gears within the gearbox are exposed directly to the lubrication fluid channeled into the sump. As a result, the size and weight of the gas turbine engine assembly may be reduced by eliminating the outer casing that encloses known gearbox assemblies.

The above-described gas turbine engine assembly and methods of assembling the gas turbine engine assembly allow rotor thrust loads and/or forces generated by the counter-rotating fan assembly and/or the booster compressor to balance rotor thrust loads and/or forces generated by the low-pressure turbine. More specifically, the present invention facilitates a transmission of rotor thrust loads and/or forces generated by the forward fan assembly directly to an aft thrust bearing assembly. Rotor thrust loads and/or forces generated by the aft end fan assembly and/or the booster compressor is transmitted through a forward thrust bearing assembly through the drive shaft to the aft thrust bearing. As a result, rotor thrust loads and/or forces generated by the aft end fan assembly and/or the booster compressor, as well as rotor thrust loads and/or forces generated by the forward fan assembly, are carried by the aft thrust bearing assembly and are counter-balanced by the low-pressure turbine rotor thrust loads and/or forces also carried by the aft thrust bearing assembly. Further, rotor thrust load and/or force transmission to the gearbox is prevented or limited so that the gearbox carries only torsional loads and/or forces.

Exemplary embodiments of a gas turbine engine assembly and methods of assembling the gas turbine engine assembly are described above in detail. The assembly and method are not limited to the specific embodiments described herein, but rather, components of the assembly and/or steps of the method may be utilized independently and separately from other components and/or steps described herein. Further, the described assembly components and/or the method steps can also be defined in, or used in combination with, other assemblies and/or methods, and are not limited to practice with only the assembly and/or method as described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

coupling a low-pressure turbine rotatable about a drive shaft to a counter-rotating fan assembly including a first fan assembly and a second fan assembly wherein the first fan assembly rotates in a first direction and the second fan assembly rotates in an opposite second direction;

positioning a planetary gearbox within a lubrication fluid sump that substantially circumscribes the gearbox such that a thrust spring coupled between a first portion of the gearbox and a second portion of the gearbox facilitates at least partially absorbing thrust generated by the counter-rotating fan assembly; and coupling the planetary gearbox substantially circumferentially about the drive shaft such that an input of the gearbox is coupled to the low-pressure turbine and an output of the gearbox is coupled to the counter-rotating fan assembly.

2. A method in accordance with claim 1 wherein coupling a planetary gearbox substantially circumferentially about the drive shaft further comprises positioning the gearbox within the lubrication fluid sump wherein the gearbox does not include an external housing.

3. A method in accordance with claim 1 further comprising:
positioning a thrust bearing in flow communication within the lubrication fluid sump; and
coupling the thrust bearing between the low pressure turbine and the gearbox.

4. A method in accordance with claim 1 wherein coupling a planetary gearbox substantially circumferentially about the drive shaft further comprises positioning the gearbox radially inward from a radial inner boundary of the lubrication fluid sump, wherein the sump is bounded at least partially by the drive shaft.

5. A method in accordance with claim 1 wherein coupling a planetary gearbox substantially circumferentially about the drive shaft further comprises positioning the gearbox within the lubrication fluid sump such that a thrust spring is coupled between a first portion of the gearbox and a second portion of the gearbox, wherein the thrust spring includes plurality of openings that extending therethrough that facilitate the thrust spring absorbing thrust generated by the counter-rotating fan assembly.

6. A method in accordance with claim 1 wherein coupling a planetary gearbox substantially circumferentially about the drive shaft comprises positioning the gearbox within the lubrication fluid sump such that the gearbox is substantially isolated from axial loads generated by each of the first fan assembly and the second fan assembly.

7. A gas turbine engine assembly comprising:
a low pressure turbine,
a counter-rotating fan assembly comprising a first fan assembly rotatable in a first direction and a second fan assembly rotatable in an opposite second direction, said second fan assembly is positioned aftward with respect to said first fan assembly, said low pressure turbine coupled to said fan assembly via a drive shaft; and
a planetary gearbox comprising an input and an output, said gearbox input coupled to said low-pressure turbine, said gearbox output coupled to said counter-rotating fan assembly; and
a lubrication fluid sump defined at least partially by said drive shaft and by a support member coupled to said second fan assembly, said planetary gearbox contained within said fluid sump such that said lubrication fluid sump substantially circumscribes said planetary gearbox.

8. A gas turbine assembly in accordance with claim 7 further comprising at least one thrust bearing coupled in flow communication within said lubrication fluid sump, said at least one thrust bearing coupled between said low pressure turbine and said gearbox.

9. A gas turbine assembly in accordance with claim 7 wherein said second fan assembly is aft of said first fan assembly, said gear box is coupled substantially circumferentially about said drive shaft, said gearbox does not include an external housing.

10. A gas turbine assembly in accordance with claim 7 wherein said planetary gearbox further comprises a first portion, a second portion, and a thrust spring coupled therebetween, said thrust spring configured to absorb thrust generated by said counter-rotating fan assembly.

11. A gas turbine assembly in accordance with claim 10 wherein said gearbox first portion, second portion, and thrust spring are integrally formed together, said thrust spring is formed with a plurality of openings extending therethrough, said openings facilitate said thrust spring absorbing thrust generated by said counter-rotating fan assembly.

12. A gas turbine assembly in accordance with claim 7 wherein said lubrication fluid sump facilitates isolated said gearbox from axial loads generated by said counter-rotating fan assembly.

13. A gas turbine engine assembly comprising:
a counter-rotating fan assembly comprising a first fan assembly rotatable in a first direction and a second fan assembly rotatable in an opposite second direction;
a core engine downstream from said counter-rotating fan assembly, said core engine coupled to said counter-rotating fan assembly via a drive shaft;
a planetary gearbox coupled to said counter-rotating fan assembly; and
a lubrication fluid sump between said core engine and said counter-rotating fan assembly, said fluid sump bounded at least partially by said drive shaft, said gearbox housed within said fluid sump such that said gearbox is substantially isolated from axial loading generated by said counter-rotating fan assembly, said fluid lubrication sump further comprises a supply tube for channeling lubrication fluid towards said gearbox and a scavenge system for removing spent cooling fluid from said lubrication fluid sump.

14. A gas turbine engine assembly in accordance with claim 13 wherein said gearbox does not include an external housing.

15. A gas turbine engine assembly in accordance with claim 13 wherein said gearbox comprises a first portion, a second portion, and a thrust spring extending between said first and second portions, said thrust spring facilitates said gearbox absorbing thrust generated by said counter-rotating fan assembly.

16. A gas turbine engine assembly in accordance with claim 13 further comprising a thrust bearing coupled between said gearbox and said core engine, said thrust bearing positioned within said lubrication fluid sump.

17. A gas turbine engine assembly in accordance with claim 13 wherein said gearbox is at least partially submerged in lubrication fluid within said lubrication fluid sump during engine operation.

* * * * *

UNITED STATES PATENT AND TRADEMARK OFFICE
CERTIFICATE OF CORRECTION

PATENT NO. : 7,493,753 B2  Page 1 of 1
APPLICATION NO. : 11/253932
DATED : February 24, 2009
INVENTOR(S) : Moniz et al.

It is certified that error appears in the above-identified patent and that said Letters Patent is hereby corrected as shown below:

Column 7, line 61, delete "afterward" and insert therefor --aftward--.

Signed and Sealed this

Ninth Day of February, 2010

David J. Kappos
*Director of the United States Patent and Trademark Office*